Oct. 30, 1962 W. GRISHKIN 3,060,618
LINE GUIDE TIP
Filed Oct. 11, 1960
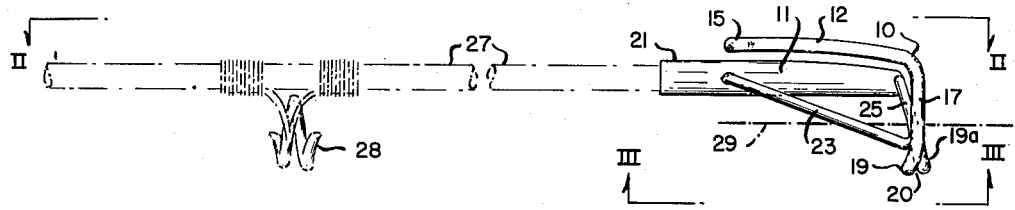
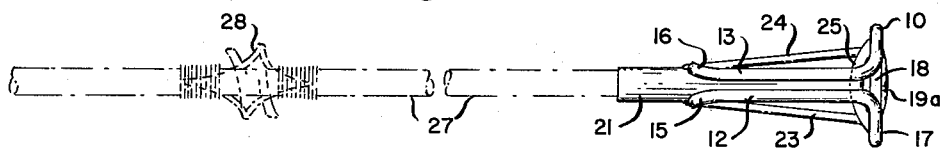
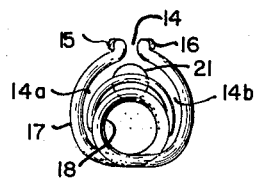
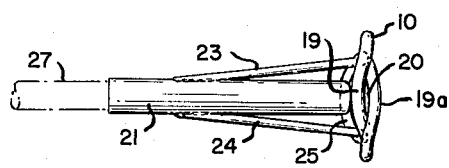
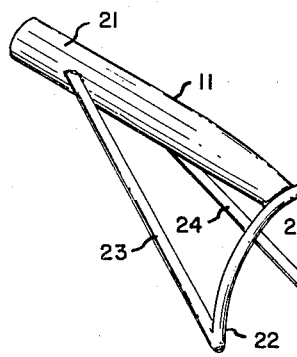
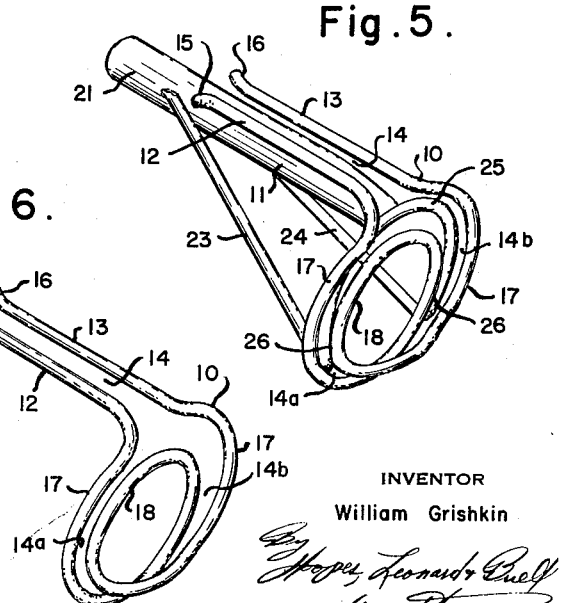
INVENTOR
William Grishkin

United States Patent Office 3,060,618
Patented Oct. 30, 1962

3,060,618
LINE GUIDE TIP
William Grishkin, Box 292, La Belle, Pa.
Filed Oct. 11, 1960, Ser. No. 61,908
5 Claims. (Cl. 43—24)

This invention relates to a line guide tip for fishing rods and the like and is particularly useful where it is desired to eliminate the conventional threading of a line on a fishing rod.

Conventional fishing rod guides require a fisherman to thread the end of the line through the line guides and then tie the paraphernalia such as hooks, flies, plugs and sinkers, etc., on the end of the line at the fishing site. Conversely, when finished fishing, the fisherman must cut his line or pick apart the knot to remove said paraphernalia before he can unstring the rod or he can leave the string and paraphernalia on the rod and run the risk of its tangling, snagging or otherwise becoming ensnarled.

Fishermen have long recognized the advantages of being able to string or remove a fishing line from a fishing rod without the necessity of breaking the line or threading the line end first through the line guides. Devices to accomplish this have been proposed heretofore; for example, United States Patent Nos. 396,707 to Parker, 703,996 to Cattley, 754,094 to Roth, 863,606 to Hoerle and 2,724,-204 to Wiglesworth. Such prior devices have enabled fishermen to string a line on a rod without threading the line end through the guides; however, they have been subject to the serious disadvantage of the line snagging on the device itself. My device obviates this latter problem and has other distinct advantages. My device is most facile and may be utilized even in the dark or in cold weather with relative ease.

I provide a line guide tip for fishing rods and the like comprising a continuous wire member the free end portions of which are in spaced parallel end-by-end relation and the center portion of which is convoluted to form a nearly full outer loop contiguous with said end portions and a full inner loop spaced within said outer loop and support means adapted for attachment to the tip of a fishing rod. Preferably, the inner loop is substantially coplanar with the outer loop. The support member is preferably of a yoke type with side braces or struts attached to a hollow body member into which the tip of a fishing rod may be inserted. The free ends of the wire member preferably lie parallel to the hollow body member and are slightly spaced therefrom and further preferably have their tips flared outwardly away from each other.

Other details, objects and advantages of the invention will become apparent as the following description of a present preferred embodiment thereof proceeds.

In the accompanying drawing, I have shown a present preferred embodiment of the invention in which:

FIGURE 1 is a side elevational view of a line guide tip embodying my invention shown mounted on the tip end of a fishing rod;

FIGURE 2 is a top plan view taken on the line II—II of FIGURE 1;

FIGURE 3 is a bottom plan view taken on the line III—III of FIGURE 1;

FIGURE 4 is an end elevational view of FGURE 1 as viewed from the right thereof;

FIGURE 5 is an isometric view of a line guide tip embodying my invention; and

FIGURE 6 is an exploded isometric view of FIGURE 5.

Referring now to the drawing, and initially to FIGURES 5 and 6, my line guide tip comprises a continuous wire member designated generally as reference 10 and a support member designated generally as reference 11. The free ends 12 and 13 of wire 10 are in spaced parallel end-by-end relation to each other leaving a gap or channel 14 therebetween. Tips 15 and 16 of free ends 12 and 13, respectively, are flared outwardly away from each other to facilitate stringing the line on my guide tip which will be more fully explained later. Tips 15 and 16 should be smoothed or rounded off so that they will not snag a line being strung on my tip. The center portion of wire 10 is convoluted to form loops 17 and 18. As is clearly shown in FIGURE 5, loop 17 is contiguous with free ends 12 and 13 and is not quite a full loop due to the spacing adjacent free ends 12 and 13 forming channel 14.

FIGURE 4 clearly shows that loop 18 is a full loop and is a smaller loop inside loop 17 and spaced therefrom to form channels 14a and 14b on respective sides of loop 18.

As shown in FIGURES 1 to 3, loop 18 is substantially coaxial and coplanar with loop 17. To position the loops in substantially coplanar relationship, wire 10 is slightly bent or curled as shown in FIGURE 3 at references 19 and 19a, which, in addition, leaves a small gap 20 which is the lower juncture of channels 14a and 14b.

Referring again to FIGURE 6, support member 11 is a yoke-type support and comprises a tubular body member 21 with a wire member 22 mounted thereon having strut portions 23 and 24 and a yoke portion 25. Wire member 22 is fastened to body member 21 at the ends of struts 23 and 24 and at the top of yoke portion 25 as shown. Wire member 10 then, is mounted on support 11 by fastening loop 18 to yoke 25 as shown at references 26 in FIGURE 5.

It is possible, of course, to simply fasten loop 18 at the top thereof to the tip of body member 21 and thus eliminate wire member 22 altogether or eliminate yoke 25 leaving struts 23 and 24 fastened to loop 18. Furthermore, with some fishing rods it is possible to weld or solder or otherwise similarly attach wire member 10 directly to the tip of the rod, the weld or solder or whatever in such case being the support member. However, I prefer yoke-type support member 11 as described and shown because of its added strength.

Referring again to FIGURES 1 and 2, I show my invention mounted on the tip of fishing rod 27. As there shown, the tip end of rod 27 is inserted into tubular body member 21 and my guide tip is thus affixed to a fishing rod. Of course, in order to fully benefit from my invention it is necessary that the remaining guides on the rod be such that the line may be fully strung on rod 27 without having to thread the line through end first. For this purpose, I recommend the use of a line guide, such as I illustrate as guide 28, which is familiar to those skilled in the art. I will now describe how to string and unstring a fishing line with my guide tip.

To string a line on my tip, a line 29 is initially led along channel 14 between free end 12 and tubular body member 21 and then down channel 14a, through gap 20, up channel 14b, out channel 14 between free end 13 and tubular body member 21 and the line is strung.

To unstring the line, the procedure is reversed. Line 29 is brought back over the top of loop 18 and laid in channel 14, line 29 is then led along channel 14 between free end 13 and tubular body member 21, down channel 14b, through gap 20, up channel 14a and finally out channel 14 between free end 12 and tubular body member 21.

This can be done quickly and easily and after a few times most fishermen will be able to do it in the dark.

It should be noted that line 29 when strung rests in loop 18 and there are no projecting ends nearby to foul the line. The free ends 12 and 13 lie back parallel to the rod and are out of the way to thus obviate any snagging problem with the guide tip.

While I have shown and described a present preferred embodiment of my invention, it is to be distinctly understood that the invention is not limited thereto but may be otherwise variously embodied within the scope of the following claims.

I claim:

1. A line guide tip for fishing rods and the like comprising a continuous wire member the free end portions of which are in spaced juxtaposition and the center portion of which is convoluted to form a nearly full outer loop contiguous with said end portions and a full inner loop spaced within said outer loop, and support means adapted for attachment to the tip of a rod, whereby said free end portions are in spaced substantially parallel relation with said rod tip.

2. A line guide tip for fishing rods and the like comprising a single wire member the free end portions of which are in spaced parallel end-by-end relation and the center portion of which is convoluted to form a nearly full outer loop contiguous with said end portions and a full inner loop spaced within said outer loop, and a yoke support member attached to said inner loop and adapted for attachment to the tip of a rod.

3. A line guide tip for fishing rods and the like comprising a continuous wire member the free end portions of which are in spaced juxtaposition and the center portion of which is convoluted to form a full inner loop and a nearly full outer loop, said inner loop being substantially coplanar and coaxial with and spaced from said outer loop, said outer loop being contiguous with said end portions, and support means adapted for attachment to the tip of a rod, whereby said free end portions are in spaced substantially parallel relation with said rod tip.

4. A line guide tip for fishing rods and the like comprising a continuous wire member the free end portions of which are in spaced parallel end-by-end relation and the center portion of which has two slightly spaced convolutions forming a full inner loop substantially circled by, coaxial with and spaced within a nearly full outer loop, said outer loop being contiguous with said end portions, and a yoke support member attached to said inner loop and adapted for attachment to the tip of a rod.

5. A line guide tip for fishing rods and the like comprising a continuous wire member the free end portions of which are in spaced juxtaposition and the center portion of which has two slightly spaced convolutions forming a full inner loop substantially circled by, coaxial with and spaced within a nearly full outer loop, said outer loop being contiguous with said end portions, and support means adapted for attachment to the tip of a rod, whereby said free end portions are in spaced substantially parallel relation with said rod tip.

References Cited in the file of this patent

UNITED STATES PATENTS

| | | |
|---|---|---|
| 2,718,085 | Bean | Sept. 20, 1955 |
| 2,762,154 | Marke | Sept. 11, 1956 |

FOREIGN PATENTS

| | | |
|---|---|---|
| 598,898 | France | Oct. 6, 1925 |
| 876,014 | Germany | May 7, 1953 |
| 260,795 | Italy | Oct. 15, 1928 |

UNITED STATES PATENT OFFICE
CERTIFICATE OF CORRECTION

Patent No. 3,060,618          October 30, 1962

William Grishkin

It is hereby certified that error appears in the above numbered patent requiring correction and that the said Letters Patent should read as corrected below.

Column 1, line 43, after "coplanar" insert -- and coaxial --; line 63, for "FGURE" read -- FIGURE --.

Signed and sealed this 26th day of March 1963.

(SEAL)
Attest:

ESTON G. JOHNSON
Attesting Officer

DAVID L. LADD
Commissioner of Patents